United States Patent [19]

Schramm et al.

[11] Patent Number: 4,506,997
[45] Date of Patent: Mar. 26, 1985

[54] ROCK BIT CONE RETENTION

[75] Inventors: Michael E. Schramm, El Toro; Edward Vezirian, Irvine, both of Calif.

[73] Assignee: Smith International, Inc., Newport Beach, Calif.

[21] Appl. No.: 553,595

[22] Filed: Nov. 21, 1983

Related U.S. Application Data

[62] Division of Ser. No. 371,360, Apr. 23, 1982, Pat. No. 4,444,518.

[51] Int. Cl.³ .................... F16C 43/02; E21B 10/22
[52] U.S. Cl. .................................... 384/96; 175/369
[58] Field of Search ............... 384/96, 92, 95; 308/DIG. 11; 175/366, 369, 370, 371

[56] References Cited

U.S. PATENT DOCUMENTS

| | | | |
|---|---|---|---|
| 1,634,318 | 7/1927 | Bull | 175/369 X |
| 1,835,523 | 12/1931 | Reed | 175/366 |
| 1,839,589 | 1/1932 | Reed | 175/369 X |
| 1,865,706 | 7/1932 | Reed | 175/369 |
| 2,664,321 | 12/1953 | Noble | 175/369 X |

Primary Examiner—Stuart S. Levy
Assistant Examiner—Thomas R. Hannon
Attorney, Agent, or Firm—Robert G. Upton

[57] ABSTRACT

A rock bit cone retention means is disclosed which primarily utilizes a series of segmented rings. The segmented rings are inserted into a relatively deep annular channel formed transverse to the axis of either a journal or a cone of a rock bit leg assembly. The complementary channel, shallow in depth, is formed in either the journal or the cone. The cone, when properly positioned on the journal, closes out the channel formed in both the cone and the journal. Upon assembly, the segments are urged within the deep groove or channel in the journal or the cone such that each of the segments do not protrude beyond the bearing surface as the cone is passed over an end of the journal. Means are provided adjacent the cone retention segment to accept a spring biasing means to urge each segment away from the bottom of the deep groove in the journal or cone. When the cone is placed over the journal, each of the segments, when they register with the complementary groove in the journal, snap into place, thus substantially locking the cone on the journal.

4 Claims, 5 Drawing Figures

4,506,997

ROCK BIT CONE RETENTION

CROSS REFERENCE TO RELATED APPLICATIONS

This is a division of application Ser. No. 371,360, filed Apr. 23, 1982, now U.S. Pat. No. 4,444,518.

BACKGROUND OF THE INVENTION

1. Field of the Invention

This invention is related to sealed friction bearing rock bits.

More particularly, this invention is related to sealed friction bearing rock bits and a method to retain the cones on the journal bearings of the rock bit.

2. Description of the Prior Art

Typically, three roller cone rock bits are fabricated with the roller cones being locked to their respective journals by ball bearings introduced to a toroidal bearing track formed both in the journal bearing and the cone, the bearings being introduced through a ball hole drilled through the shirttail portion of each leg intersecting the toroidal track formed between the cone and the journal. As the bearings are introduced one by one, the track is eventually filled. A ball plug then is welded into the ball hole through the shirttail side of the rock bit leg.

The foregoing system of retaining roller cones on journals of rock bits inherently weakens the journals since a relatively large ball admitting hole is drilled through the shirttail portion of each leg of the rock bit.

U. S. Pat. No. 4,266,622, assigned to the same assignee as the present application, teaches a method to retain roller cones on journal bearings. This invention teaches the use of segmented cone retention ring members positioned in a deep slot formed in the bearing surface of the journal, the segments being subsequently E.B. welded, locking the roller cone on its journal. The segments, upon assembly, are inserted all the way into deepened slots in the journal so that they will clear the inside diameter of each of the cones during assembly of the cone on the journal. When the cone is properly aligned on the journal, the segments are E.B. welded within the cone bore by providing an access hole through the journal.

The present invention eliminates the need to metallurgically bond cone retention rings in rock bits. Moreover, the necessity to drill relatively large weld or ball access holes through each of the journals is eliminated by the instant invention.

SUMMARY OF THE INVENTION

It is an object of the invention to provide a means to secure rotating cones on friction journal bearings without access holes through the journal.

It is yet another object of the present invention to eliminate any need to weld the ring segments to either the rotating cone or the journal bearing to secure the cone on the journal.

A rotary rock bit is disclosed having a main bit body with at least one leg extending therefrom. Each leg forms a journal bearing that projects radially inwardly, each journal having a first base portion and a second end. The journal forms an outwardly facing bearing surface with a first annular groove in the bearing surface that is transverse to an axis of the journal. A cutter cone is adapted to be rotatively mounted on the journal, each cone forming an inwardly facing bearing surface. The bearing surface is adapted to register with the journal bearing surface. The cone further forms a second annular groove in the cone bearing surface that is transverse to the axis of the cone. The second annular groove in the cone registers with the first annular groove in the journal when the cone is properly positioned on the journal.

Two or more substantially annular cone retention segments are provided. The segments, when positioned within one of the grooves, allow the cone to pass over the second end of the journal. Segment biasing means are provided to bias each of the two or more segments into the other of the grooves when the first and second annular grooves register with one another, thus retaining the rotatable cone on the journal.

An advantage over the prior art is the ability to lock the cones on the journals without the necessity of large access holes to secure the ring segments on the journal.

Yet another advantage over the prior art is the ability to assemble the rotating cones on bearing surfaces of a journal without the necessity of welding the ring segments on either the journal or the cone. Of course, to weld the cone retention segments on the journal or the cone, an access hole must be provided either through the shirttail side of each leg clear through the journal of each leg assembly or through each of the cones.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
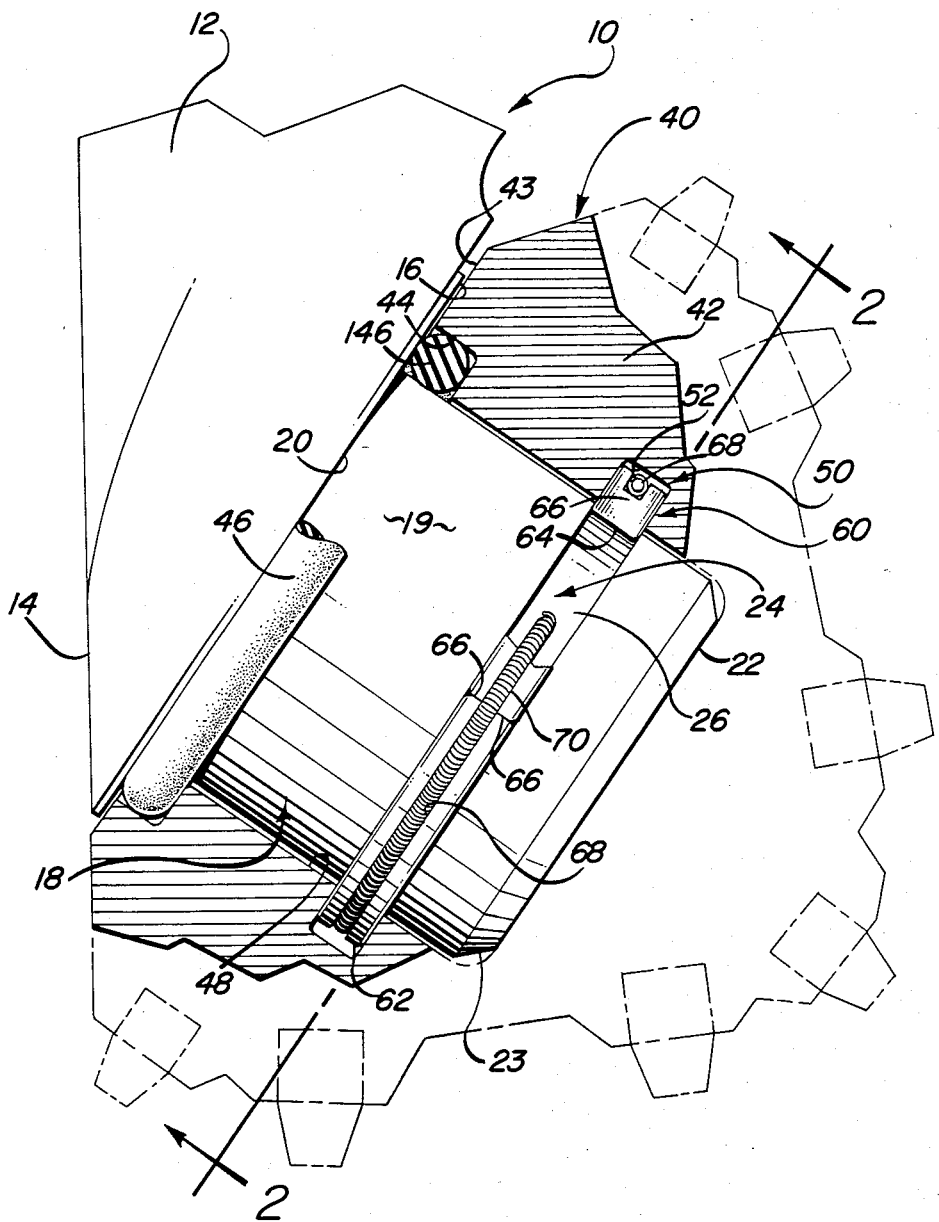
FIG. 1 is a partial cross section of a single leg of a multi-leg rock bit showing a rotating cone, partially in phantom, assembled on a journal of the leg of the rock bit.

Turning now to FIG. 1, the lower portion of a rock bit, generally designated as 10, consists of one or more rock bit legs 12. Each leg defines a shirttail portion 14, leg backface 16 and a journal, generally designated as 18. The journal consists of a base end 20 and a radially disposed end 22. A beveled surface 23 transitions between end 22 and a bearing surface 19 formed by journal 18. A groove, generally designated as 24, is formed in bearing surface 19 of journal 18. The groove is oriented transverse to the axis of the journal. The base 26 of the groove 24 is relatively shallow to maintain the integrity of the journal. The groove 24 is formed near end 22 to provide ample bearing surface 19 on the journal 18 and to prevent fatigue stress risers near base 20 of the journal during operation of the rock bit.

A rock bit cutter cone, generally designated as 40, consists of cone body 42 which forms cone backface 43 and a seal gland 44. Cone 40 further defines an internal bearing surface 48, the inside diameter of which mates with or registers with the bearing surface 19 of journal 18. A relatively deep groove, generally designated as 50, is formed in cone 40, transverse to the axis of the cone. Groove 50 registers with groove 24 in the journal 18 when the cone 40 is properly positioned axially and concentrically over the bearing 19 of journal 18. The bottom or base 52 of groove 50 is sufficiently deep in the cone 40 to accept two or more cone retention segments, generally designated as 60. The cone retention segments 60 are generally square in cross section and fit within grooves 50 and 24 defined between cone 40 and journal 18. The outside diameter 62 and the inside diameter 64 of cone retention segment 60, when placed in the deepest recess of groove 50, allow the cone to pass over end 22 of journal 18 without the segments interfering with the bearing surface 19 of journal 18.

Figure 2:
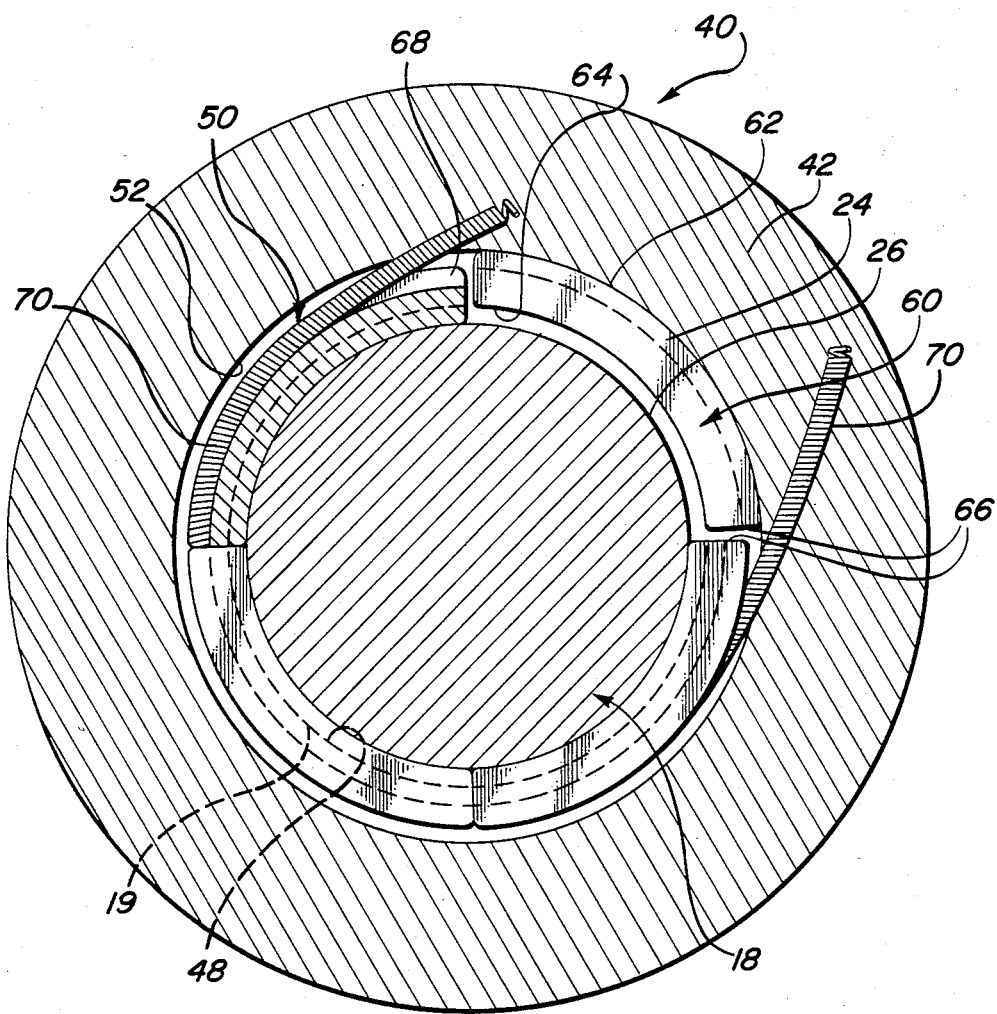
FIG. 2 is a section taken through 2—2 of FIG. 1 illustrating a rotating cone on a journal and the method in which the cone is retained on the journal through a series of cone retention segments biased inwardly by a garter spring.

Referring now to FIG. 2, it is clearly seen that when each of the cone retention segments 60 are biased against groove bottom 52 of groove 50, the segments clear the bearing surface 19 of journal 18 as the cone is slipped over end 22 of journal 18. The beveled surface 23 gradually forces each of the biased segments 60 into groove 52 to allow the cone to pass over the journal 18. A garter spring 70, for example, is positioned within a groove 68 in each of the cone retention segments 60. The garter spring, of course, stretches in tension during cone assembly to allow each of the segments 60 to be forced within groove 50 so that a portion of the outside diameter (O.D.) 62 of the cone retention segment 60 seats against bottom 52 of groove 50. The cone then is able to slip over the outer surface 19 of journal 18. When the cone is properly positioned over the journal of the rock bit leg 12, the segments 60 drop or snap into groove 24 in journal 18, urged by the tension of the stretched garter spring 70. The inside diameter (I.D.) 64 of cone retention segments 60 now seat against the bottom or base 26 of groove 24, thereby substantially locking the cone on the journal while allowing the cone 40 to rotate on the journal 18.

Figure 3:
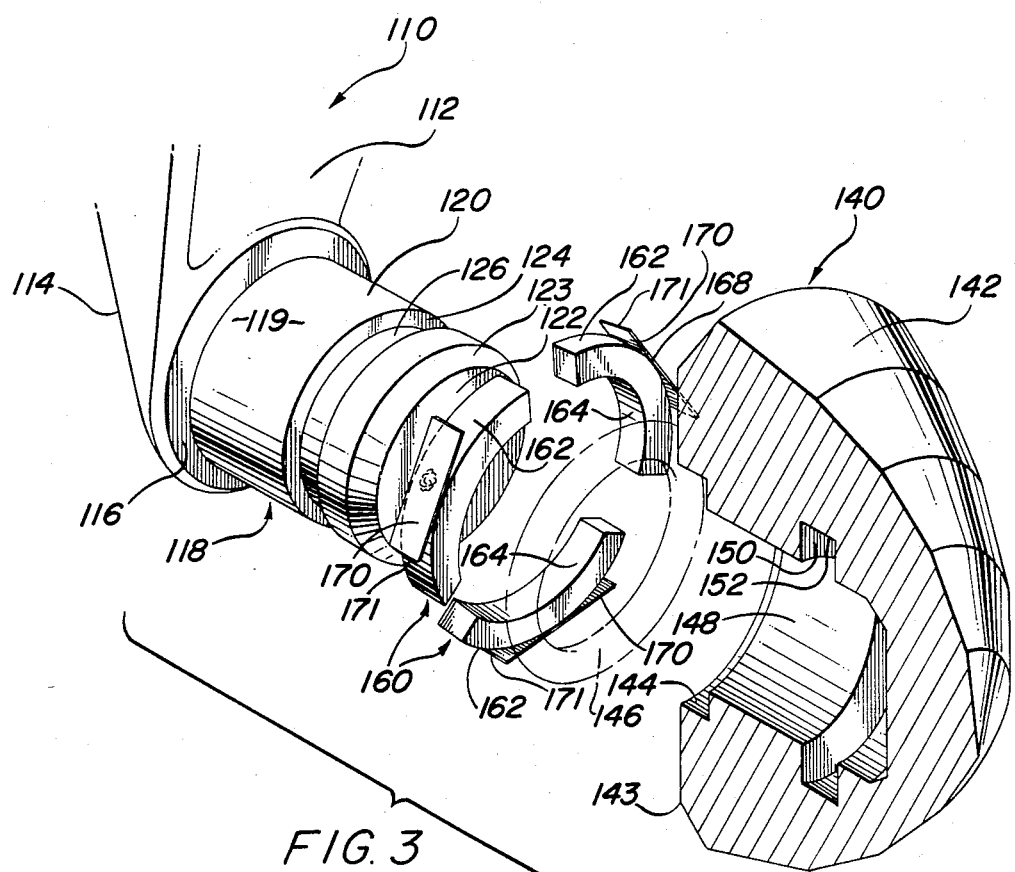
FIG. 3 is an exploded perspective view of an alternative embodiment of the present invention illustrating a cone in cross section with three ring segments adapted to be positioned within a deep groove in the cone transverse to the cylindrical bearing surface defined by the cone.

The perspective view of FIG. 3, showing the exploded parts of an alternative cone retention means, depicts a leg of a rotary cutter rock bit 110 which defines leg portion 112, shirttail portion 114 and leg backface portion 116. Cantilevered from the leg 112 is a journal, generally designated as 118. The journal defines a base end 120 and a terminating end 122 with a beveled surface 123 formed in end 122 of the journal 118. The outer surface of the journal defines a bearing surface 119 and an annular shallow groove 124, terminating in base surface 126.

A rotary cone, generally designated as 140, defines cone body 142 which forms an internal bore bearing surface 148. Within bearing surface 148 is a relatively deep annular groove 150, transverse to the axis of the cone 140, which terminates in groove bottom 152. The cone further defines backface 143 and an annular seal gland 144.

In this configuration, three cone retention segments, generally designated as 160, retain the cone on the journal 118. Segments 160 form a cross section of which conforms to the dimensions of the annular groove 150. The I.D. 164 and the O.D. 162 of segment 160 define a cone retention member that will drop entirely within groove 150 such that the inside diameter 164 will not interfere with the outside diameter of bearing surface 119 of journal 118. Segment biasing means, such as a leaf spring 170, are secured to the outside diameter 162 of the segments 160. The leaf springs may be metallurgically bonded to the outside diameter 162 at a flattened portion 168 on O.D. 162 of segments 160. The leaf spring could, for example, be spot-welded at a point between the free ends 171 of the spring 170 to portion 168 of each segment 160. The free end 171 of leaf spring 170 deflect and conform to bottom 152 of groove 150 when the segments 160 are forced deep within the groove 150 in cone 140. To assemble the cone 140 onto the journal 118, each of the segments 160 are dropped within groove 150. The O-ring 146 (shown in phantom) is slipped over the bearing surface 119 to seat against the leg backface 116. The segments 160 are then dropped within groove 150 of cone 140. The cone is then slipped over end 122 of journal 118 and, as the cone retention segments contact the beveled surface 123 in the end 122 of journal 118, the segments are urged deep within the groove 150 of cone 140. The ends 171 of leaf spring 170 deflect and allow the segments to seat themselves against base 152 of groove 150. As the cone is pushed axially over the bearing surface 119 of journal 118, the two grooves 124 and 150 register with one another when the cone is properly positioned on the journal 118 and the cone segments 160 then snap or drop within groove 124 of journal 118, thereby substantially locking the cone on the journal. Ends 171 of leaf spring 170 then unload or straighten out. The ends 171 barely come in contact with the bottom or base 152 of cone retention groove 150.

Figure 4:
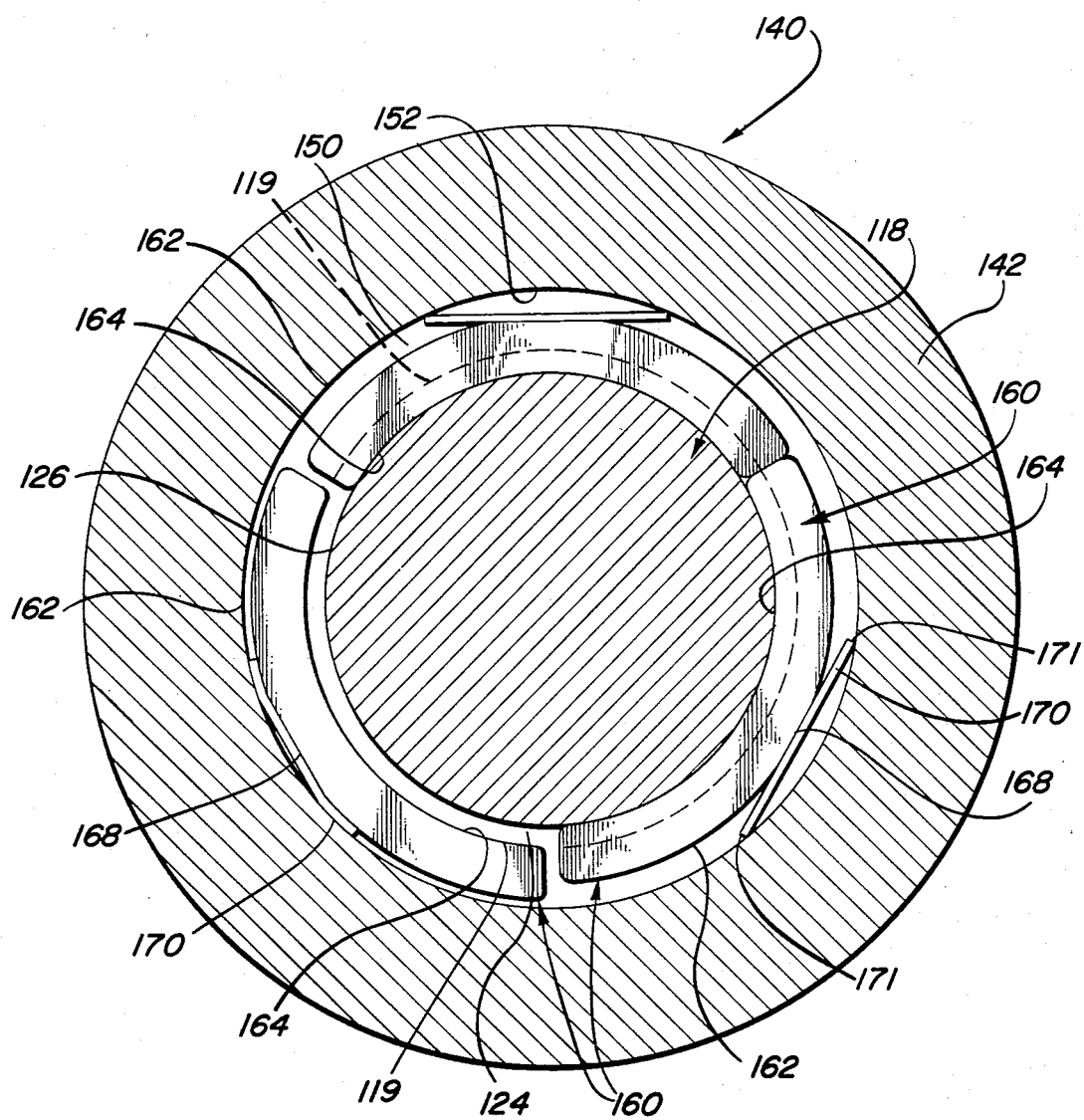
FIG. 4 is a section taken through the alternative embodiment of the present invention illustrating the means in which three biased segments retain the cone on the journal.

With reference to FIG. 4, it can readily be seen that, when the leaf spring is in its relaxed state, the ends 171 barely contact bottom 152 of groove 150 in the cone 140 when the rotatable cone is assembled on the journal. The leaf spring ends 171 are free to bias the cone retention segments 160 within groove 124 of journal 118.

Figure 5:
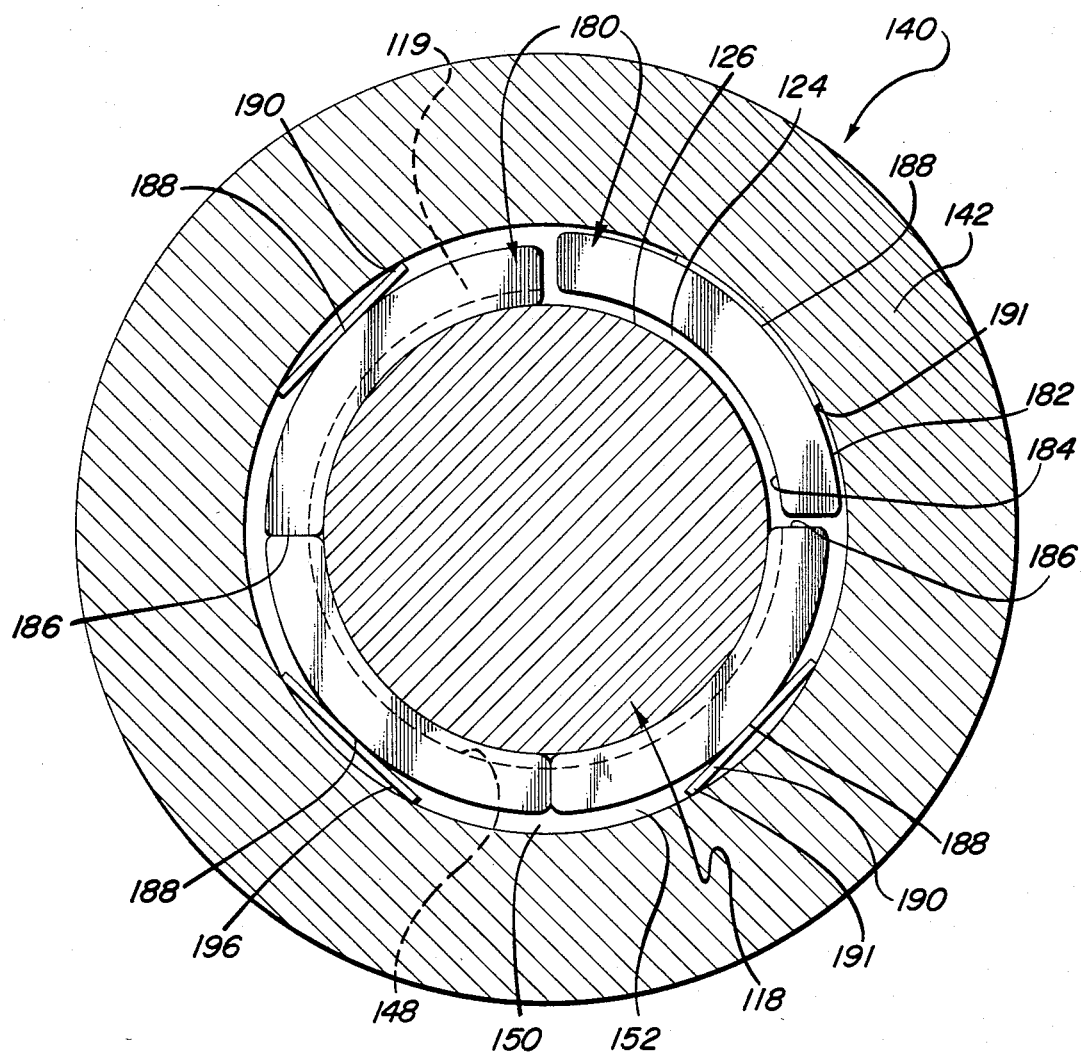
FIG. 5 is a section through the alternative embodiment of the present invention illustrating the means in which four biased segments retain a cone on a rock bit journal.

With reference to FIG. 5, this view differs from FIG. 4 in that there are four rather than three cone retention segments. Each of the four cone retention segments 180 define end portions 186, outside diameters 182, inside diameters 184 and a flat portion 188 in O.D. 182 to provide a mounting base for a leaf spring 190. The free ends 191 bias the cone retention segments 180 within groove 124 of journal 118. Like cone retention segments 160, the free ends 191 of leaf springs 190, attached to cone retention segments 180, barely contact the bottom 152 of groove 150 when the spring 190 is in a relaxed state, thus allowing the four segments to substantially lock the cone 140 onto the journal 118 with a minimum degree of frictional drag. The cone 140 may then rotate relatively freely on the journal 118.

The cone retention segments, as depicted in FIGS. 1, 2, 3, 4 and 5, may be fabricated from steel, beryllium copper, aluminum bronze or other composites. the leaf springs 170 and 190, associated with FIGS. 4 and 5, may be fabricated from hard-drawn steel, music wire, oil tempered stainless steel, beryllium copper or the like. The garter spring, shown in FIGS. 1 and 2, may be fabricated from the same family of metallic materials named with reference to the leaf springs 170 and 190. One of several spring manufacturers that fabricate springs for use in, for example, the preferred embodiments of FIGS. 1 and 2 is named as follows: York Spring Company, P.O. Box 228-T, Elgin, Ill., 60120.

It would be obvious to fabricate the cone retention segments from plastic material, such as, glass-filled epoxy or other nonmetallic composites.

It would additionally be obvious to position the grooves 50 and 24 of FIGS. 1 and 2 and 150 and 124 of FIGS. 3, 4 and 5 in any longitudinal position along the journals 18 and 118 as long as each of the transverse grooves in the cone and the journal register to properly position the cones on the journals. The grooves could be near the base of the journal or they could be positioned toward the end of the journal without departing from the scope of this invention. Obviously, the most desirable position would be a location as depicted in FIGS. 1, 2, 3, 4 and 5. When the grooves are positioned toward the end of the journal, more bearing surface is provided and the bearing will last longer due to the increased bearing surfaces between the cone and the journal.

It would also be obvious to provide a deep groove in the journal and a shallow groove in the cone. The cone retention segments, for example, are biased into the deep groove in the journal as the cone is slipped over the journal. The segments snap into a shallow groove in the cone when the grooves register with one another. A curved leaf spring segment biasing means would be positioned adjacent the inside diameter of each cone retention segment with the free ends of the curved leaf spring contacting the bottom of the groove in the journal (not shown).

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

We claim:

1. A rotary rock bit comprising:
   a main bit body having at least one leg extending therefrom, each leg having a journal bearing projecting substantially radially inwardly from said leg, said journal having a first base portion and a second end, said journal further forms a first annular groove in a bearing surface formed by said journal bearing, said groove is transverse to an axis of said journal;
   a cutter cone adapted to be rotatively mounted on said journal bearing, each cone forming an inwardly facing bearing surface adapted to register with said journal bearing surface, said cone further forms a second annular groove in said cone bearing surface transverse to the axis of the cone, said second annular groove in said cone registers with said first annular groove in said journal when said cone is properly positioned on said journal;
   two or more substantially annular cone retention segments, said segments when positioned within one of said grooves allow said cone to pass over said second end of said journal; and
   segment biasing means to bias each of said two or more segments into the other of said grooves when said first and second annular grooves register with one another thus retaining said rotatable cone on said journal said biasing means is a coil spring means adjacent said outside diametrical surface formed by each of said segments, said coil spring means is in tension to urge said segments into said first annular groove.

2. The invention as set forth in claim 1 wherein said spring means is a continuous garter spring.

3. The invention as set forth in claim 2 wherein said garter spring is fabricated substantially from steel.

4. The invention as set forth in claim 3 wherein an annular groove is formed in said outside diametric surface of each of said cone retention segments, said groove serves to retain said garter spring biasing means within each of said segments.

* * * * *